US012333258B2

(12) United States Patent
Tiwari et al.

(10) Patent No.: US 12,333,258 B2
(45) Date of Patent: Jun. 17, 2025

(54) MULTI-LEVEL EMOTIONAL ENHANCEMENT OF DIALOGUE

(71) Applicant: Disney Enterprises, Inc., Burbank, CA (US)

(72) Inventors: Sanchita Tiwari, Cumming, GA (US); Justin Ali Kennedy, Norwell, MA (US); Dirk Van Dall, Shelter Island, NY (US); Xiuyang Yu, Unionville, CT (US); Daniel Cahall, Philadelphia, PA (US); Brian Kazmierczak, Hamden, CT (US)

(73) Assignee: Disney Enterprises, Inc., Burbank, CA (US)

( * ) Notice: Subject to any disclaimer, the term of this patent is extended or adjusted under 35 U.S.C. 154(b) by 282 days.

(21) Appl. No.: 17/894,967

(22) Filed: Aug. 24, 2022

(65) Prior Publication Data
US 2024/0070399 A1 Feb. 29, 2024

(51) Int. Cl.
*G06F 40/35* (2020.01)
*G06F 40/284* (2020.01)
(Continued)

(52) U.S. Cl.
CPC ............ *G06F 40/35* (2020.01); *G06F 40/284* (2020.01); *G06F 40/289* (2020.01); *G06N 20/00* (2019.01); *G10L 13/08* (2013.01); *G10L 25/63* (2013.01)

(58) Field of Classification Search
CPC ...... G06F 40/35; G06F 40/284; G06F 40/289; G06F 40/216; G06F 40/30; G06N 20/00;
(Continued)

(56) References Cited

U.S. PATENT DOCUMENTS 11,122,240 B2 * 9/2021 Peters .................... G06V 20/41
11,170,175 B1 * 11/2021 Kohli ....................... G06N 3/08
(Continued)

OTHER PUBLICATIONS

Yi Lei, Shan Yang, Lei Xie "Fine-Grained Emotion Strength Transfer, Control and Prediction for Emotional Speech Synthesis" IEEE Spoken Language Technology Workshop (SLT), Shenzhen, China, 2021, pp. 423-430.
(Continued)

*Primary Examiner* — Thuykhanh Le
(74) *Attorney, Agent, or Firm* — Farjami & Farjami LLP

(57) ABSTRACT

A system for emotionally enhancing dialogue includes a computing platform having processing hardware and a system memory storing a software code including a predictive model. The processing hardware is configured to execute the software code to receive dialogue data identifying an utterance for use by a digital character in a conversation, analyze, using the dialogue data, an emotionality of the utterance at multiple structural levels of the utterance, and supplement the utterance with one or more emotional attributions, using the predictive model and the emotionality of the utterance at the multiple structural levels, to provide one or more candidate emotionally enhanced utterance(s). The processing hardware further executes the software code to perform an audio validation of the candidate emotionally enhanced utterance(s) to provide a validated emotionally enhanced utterance, and output an emotionally attributed dialogue data providing the validated emotionally enhanced utterance for use by the digital character in the conversation.

21 Claims, 6 Drawing Sheets

(51) Int. Cl.
*G06F 40/289* (2020.01)
*G06N 20/00* (2019.01)
*G10L 13/08* (2013.01)
*G10L 25/63* (2013.01)

(58) Field of Classification Search
CPC ... G10L 13/08; G10L 25/63; G10L 2013/083; G10L 13/10
USPC .......................................................... 704/9
See application file for complete search history.

(56) References Cited

U.S. PATENT DOCUMENTS

| | | | | |
|---|---|---|---|---|
| 11,238,519 | B1* | 2/2022 | Ravi | G06Q 30/0631 |
| 11,526,541 | B1* | 12/2022 | Chadwick | G06F 40/30 |
| 11,562,744 | B1* | 1/2023 | Gao | G10L 13/033 |
| 11,721,357 | B2* | 8/2023 | Togawa | G10L 25/18 |
| | | | | 704/233 |
| 11,756,567 | B2* | 9/2023 | Wilson | G06N 3/045 |
| | | | | 704/235 |
| 11,854,538 | B1* | 12/2023 | Rozgic | G10L 25/63 |
| 11,900,914 | B2* | 2/2024 | Fernandez Guajardo | |
| | | | | G06Q 30/02 |
| 12,106,746 | B2* | 10/2024 | Lin | G10L 13/08 |
| 12,288,560 | B2* | 4/2025 | Reece | G10L 25/63 |
| 2003/0023443 | A1* | 1/2003 | Shizuka | G10L 13/00 |
| | | | | 704/260 |
| 2008/0077387 | A1* | 3/2008 | Ariu | G10L 15/22 |
| | | | | 704/E15.04 |
| 2011/0208522 | A1* | 8/2011 | Pereg | G06F 40/35 |
| | | | | 704/235 |
| 2014/0303957 | A1* | 10/2014 | Lee | G06F 40/58 |
| | | | | 704/2 |
| 2015/0038806 | A1* | 2/2015 | Kaleal, III | A61B 5/4833 |
| | | | | 600/301 |
| 2016/0329043 | A1* | 11/2016 | Kim | G10L 13/10 |
| 2017/0125008 | A1* | 5/2017 | Maisonnier | G10L 13/08 |
| 2017/0162186 | A1* | 6/2017 | Tamura | G10L 13/047 |
| 2019/0220505 | A1* | 7/2019 | Shinohara | G06F 13/00 |
| 2019/0251152 | A1* | 8/2019 | Leydon | G06F 40/30 |
| 2020/0042285 | A1* | 2/2020 | Choi | G10L 25/84 |
| 2020/0066264 | A1* | 2/2020 | Kwatra | G10L 25/63 |
| 2020/0286506 | A1* | 9/2020 | Deshpande | G10L 25/63 |
| 2021/0011545 | A1* | 1/2021 | Min | H04M 1/72409 |
| 2021/0097976 | A1* | 4/2021 | Chicote | G10L 13/10 |
| 2021/0097980 | A1* | 4/2021 | Lezzoum | G10L 13/033 |
| 2021/0151034 | A1* | 5/2021 | Hasan | G10L 15/16 |
| 2021/0151046 | A1* | 5/2021 | Nicholson | G10L 15/26 |
| 2021/0183358 | A1* | 6/2021 | Mao | G10L 17/04 |
| 2021/0201162 | A1* | 7/2021 | Bhan | G06N 3/084 |
| 2021/0233031 | A1* | 7/2021 | Preuss | G06F 3/011 |
| 2021/0264900 | A1* | 8/2021 | Reece | G06F 3/167 |
| 2021/0264921 | A1* | 8/2021 | Reece | G06F 40/169 |
| 2021/0264929 | A1* | 8/2021 | Osebe | G10L 21/003 |
| 2021/0287657 | A1* | 9/2021 | Deng | G06F 40/30 |
| 2021/0295820 | A1* | 9/2021 | Hirvonen | H04S 7/30 |
| 2021/0335367 | A1* | 10/2021 | Graff | G06F 40/20 |
| 2021/0343270 | A1* | 11/2021 | Zhang | G10L 15/08 |
| 2021/0365962 | A1* | 11/2021 | Tolentino | G06N 20/00 |
| 2022/0059225 | A1* | 2/2022 | Shah | A61K 45/06 |
| 2022/0132218 | A1* | 4/2022 | Aher | H04N 21/4667 |
| 2022/0165254 | A1* | 5/2022 | Decker | G06F 40/284 |
| 2022/0180893 | A1* | 6/2022 | Lihan | G06F 3/167 |
| 2022/0223064 | A1* | 7/2022 | Chauhan | G06F 3/0482 |
| 2022/0392428 | A1* | 12/2022 | Fernandez Guajardo | |
| | | | | G10L 13/08 |
| 2023/0007359 | A1* | 1/2023 | Aher | G06F 16/7844 |
| 2023/0058259 | A1* | 2/2023 | Suneja | G06N 20/00 |
| 2023/0096543 | A1* | 3/2023 | Moy | G10L 15/22 |
| | | | | 704/3 |
| 2023/0102789 | A1* | 3/2023 | Nigul | G06F 16/22 |
| | | | | 705/7.25 |
| 2023/0111824 | A1* | 4/2023 | Mukherjee | G06N 3/08 |
| | | | | 704/200 |
| 2023/0114150 | A1* | 4/2023 | Lillelund | G06F 40/284 |
| | | | | 704/251 |
| 2023/0138741 | A1* | 5/2023 | Patel | G06Q 50/01 |
| | | | | 704/235 |
| 2023/0222293 | A1* | 7/2023 | Key | G06F 40/20 |
| | | | | 704/9 |
| 2023/0229934 | A1* | 7/2023 | Iwama | G06N 5/02 |
| | | | | 706/46 |
| 2023/0245651 | A1* | 8/2023 | Wang | G06N 5/022 |
| | | | | 704/275 |
| 2023/0259437 | A1* | 8/2023 | White | H04N 7/15 |
| | | | | 710/18 |
| 2023/0260536 | A1* | 8/2023 | Xu | G10L 25/63 |
| | | | | 704/231 |
| 2023/0298616 | A1* | 9/2023 | Brownlee | G10L 21/10 |
| | | | | 704/270 |
| 2023/0335123 | A1* | 10/2023 | Liu | G10L 15/04 |
| 2023/0350847 | A1* | 11/2023 | Cluff | G06F 16/9035 |
| 2023/0368146 | A1* | 11/2023 | Pande | G06Q 10/1053 |
| 2023/0379543 | A1* | 11/2023 | Singh | H04N 21/42201 |
| 2023/0379544 | A1* | 11/2023 | Singh | H04N 21/42201 |
| 2023/0412686 | A1* | 12/2023 | Mansaray | G06N 3/045 |
| 2024/0005082 | A1* | 1/2024 | Yin | G06F 40/20 |
| 2024/0005335 | A1* | 1/2024 | Foy | G05D 1/0088 |
| 2024/0005905 | A1* | 1/2024 | Chen | G10L 25/63 |
| 2024/0070397 | A1* | 2/2024 | Yuan | G06V 40/165 |
| 2024/0105207 | A1* | 3/2024 | Kruk | G10L 25/63 |
| 2024/0249740 | A1* | 7/2024 | Nesfield | H04R 3/005 |

OTHER PUBLICATIONS

Kun Zhou, Berrak Sisman, Rajib Rana, Bjorn W. Schuller, Haizhou Li "Emotion Intensity and it's Control for Emotional Voice Conversion" IEEE Transaction on Affective Computing May 2022 18 Pgs.

Kaichun Yao, Libo Zhang, Tiejian Luo, Dawei Du, Yanjun Wu "Non-deterministic and emotional chatting machine: learning emotional conversion generation using conditional variational autoencoders" Neural Computing and Applications Sep. 21, 2020 pp. 5581-5589.

Jong Yoon Lim, Inkyu Sa, Ho Seok Ahn, Norina Gasteiger, Sanghyub John Lee, and Bruce MacDonald "Substance Extraction from Text Using Cpverage-Based Deep Learning Language Models" MDPI Apr. 12, 2021 pp. 1-27.

Kai Yang, Raymond Y. K. Lau, and Ahmed Abbasi "Getting Personal: A Deep Learning Artifact for Text-based Measurement of Personality" Forthcoming in Information Systems Research (ISR), 2022 48 Pgs.

* cited by examiner

MULTI-LEVEL EMOTIONAL ENHANCEMENT OF DIALOGUE

BACKGROUND

Advances in artificial intelligence (AI) have led to the generation of a variety of digital characters, such as avatars for example, that simulate social interaction. However, conventionally generated AI digital characters typically project a single synthesized persona that tends to lack a distinctive personality and is unable to credibly express emotions.

In contrast to conventional interaction simulations by AI digital characters, natural interactions between human beings are more nuanced, varied, and dynamic. For example, conversations between humans are typically expressive of the emotional states of the dialogue partners. That is to say, typical shortcomings of AI digital character interactions include their failure to inflect the words they utter with emotional states such as excitement, disappointment, anxiety, and optimism, to name a few. Thus, there is a need in the art for a dialogue enhancement solution capable of producing emotionally expressive utterances for execution in real-time during a dialogue between a digital character and a dialogue partner such as a human user.

DETAILED DESCRIPTION

Figure 1:
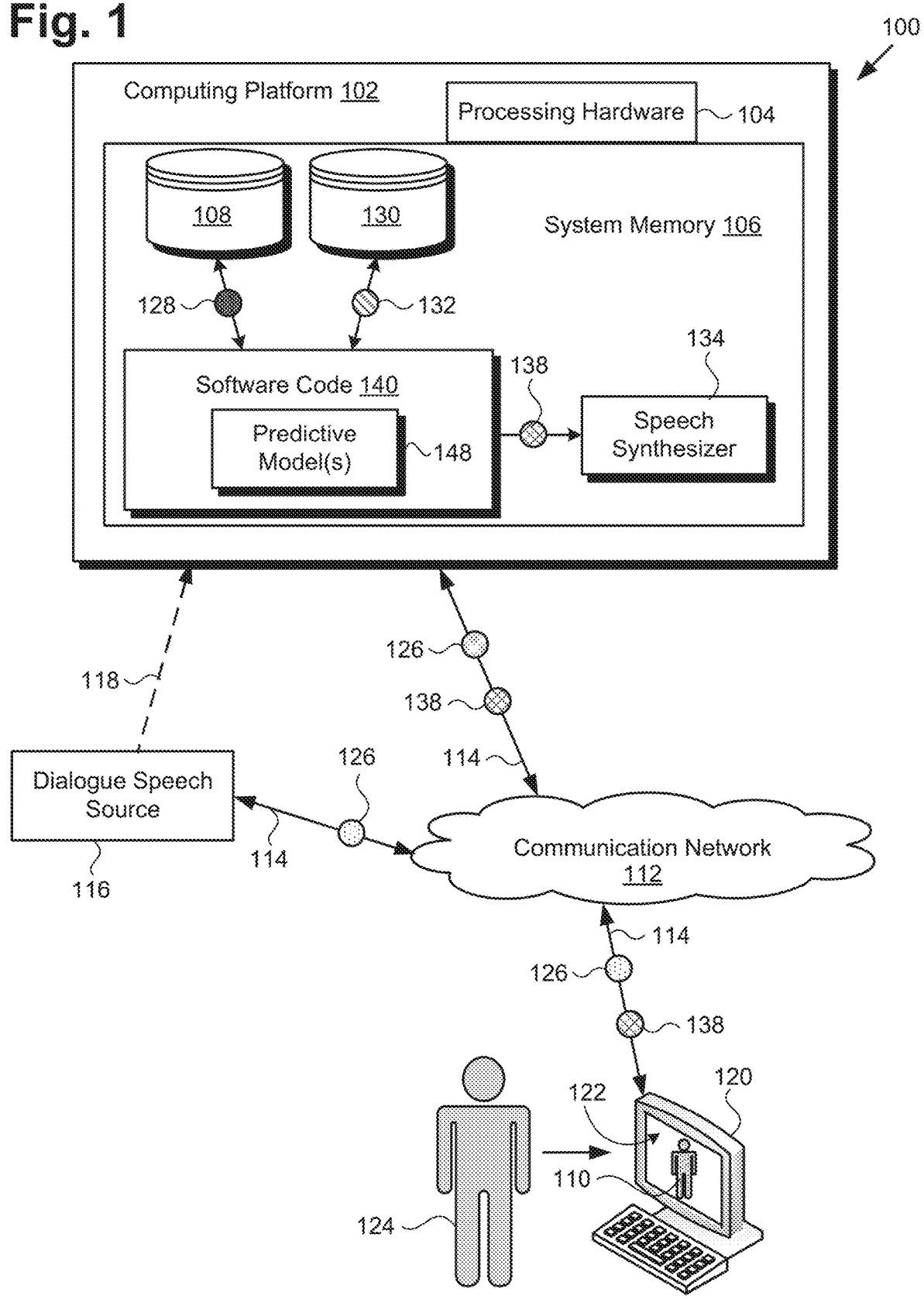
FIG. 1 shows an exemplary system for emotionally enhancing dialogue, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for emotionally enhancing dialogue. That is to say, the present application discloses systems and methods for inflecting speech that has been scripted for a digital character to credibly express emotions attributable to the digital character, by varying prosody, word rate, and audible breathing, for example, as well as through the use of non-verbal fillers such as pauses. Moreover, the present dialogue enhancement solution can advantageously be implemented as substantially automated systems and methods.

It is noted that, as defined for the purposes of the present application, the terms "automation," "automated," and "automating" refer to systems and processes that do not require the participation of a human system administrator. Although in some implementations the emotionally enhanced dialogue produced by the systems and methods disclosed herein may be reviewed or even modified by a human editor or system administrator, that human involvement is optional. Thus, the methods described in the present application may be performed under the control of hardware processing components of the disclosed systems.

It is further noted that, as defined for the purposes of the present application, the expressions "utterance" and "entire utterance" refer to a scripted statement or dynamically generated response provided by a generative model, such as Generative Pre-Trained Transformer 3 (GPT3) for example, for use by a digital character in conversation with an interaction partner, such as a human user for example. Such an utterance or entire utterance may include a single sentence or more than one sentence in sequence. Moreover and as further defined for the purposes of the present application, an "emotionally enhanced utterance" refers to an utterance to which one or more emotional attributions (hereinafter also "emotional attribution tags") have been applied based on the emotional state, i.e., sentiment and mood, of the digital character, as well as, in some implementations, on one or both of a character persona of the digital character or an interaction history of the digital character with the interaction partner. Thus, an emotionally enhanced utterance may include emotional attributions applied based on past interactions between the digital character and interaction partner, an idiosyncratic personality of the digital character, or the emotional state of the digital character.

It is also noted that an emotionally enhanced utterance may include one or more of non-verbal vocalizations or non-verbal fillers, such as pauses for example, in addition to emotionally inflected language based communications in the form of speech or text. Examples of non-verbal vocalizations may include a sigh, a murmur of agreement or disagreement, audible breathing, or a giggle, to name a few. Examples of emotionally inflected language include language displaying one or more of changing word rate, i.e., the rapidity with which words are spoken, or variations in prosody. As used herein, the term "prosody" has its commonly understood meaning in linguistics as referring to characteristics of speech such as vocal pitch, loudness, intonation, timbre, and the like.

Furthermore, as used in the present application, the term "digital character" refers to a virtual communicative entity that is designed for expressive interaction with one or more interaction partners, which may be human users for example. In some use cases, a digital character may be instantiated as a virtual character rendered on a display and appearing to watch and listen to an interaction partner in order to have a conversation with the interaction partner. Such a digital character may be rendered as part of a two-dimensional (2D) or three-dimensional (3D) animation including digital representations of persons, fictional characters, locations, objects, and identifiers such as brands and logos, for example, which populate a virtual reality (VR), augmented reality (AR), or mixed reality (MR) environment. Moreover, a virtual environment including such a digital character may depict virtual worlds that can be experienced by any number of users synchronously and persistently, while providing continuity of data such as personal identity, user history, entitlements, possessions, payments, and the like. It is noted that the concepts disclosed by the present application may also be used to instantiate a digital character in media that is a hybrid of traditional audio-video (AV) content and fully immersive VR/AR/MR experiences, such as interactive video.

As defined for the purposes of the present application, the term "emotionality" refers to the sentiment and mood attributable to an utterance at one or more structural levels of the utterance. Mood refers to a transitory emotional state, such as happy, sad, anxious, or angry, to name a few examples, while sentiment refers to a more persistent emotional state or psychological frame of mind, such as outgoing, depressive, energetic, optimistic, again to name a few examples. The various structural levels at which an utterance may be analyzed for its emotionality may include one or more of the entire utterance, as defined above, the level of phrases included in the utterance, or the level of tokens included in the utterance. As defined herein, a "token" is defined to be a single word, or in some instances two words, which identify a single thing. Thus, any word can typically be considered a token, while some word combinations, such New York, Palm Springs, or Las Vegas, for example, may each also be interpreted to be a single token. The term "phrase" is defined herein to refer to a subsection of an utterance including two or more sequential tokens that convey an idea. For example, where an utterance includes multiple sentences, a phrase may refer to any subset of those sentences or a portion of a sentence, such as a clause within a sentence.

In addition, as defined in the present application, the feature "character persona" refers to a template or other representative model providing an exemplar for a particular digital character. That is to say, a character persona may be affirmatively associated with one or more of a specific character name, specific visual features, prosody, or idiosyncratic expressions or vocal mannerisms, for example.

FIG. 1 shows a diagram of system 100 for emotionally enhancing dialogue, according to one exemplary implementation. As shown in FIG. 1, system 100 includes computing platform 102 having processing hardware 104, and system memory 106 implemented as a computer-readable non-transitory storage medium. According to the present exemplary implementation, system memory 106 stores software code 140 including one or more predictive models 148 (hereinafter "predictive model(s) 148"), and in some implementations may also store one or more of user profile database 108, character persona database 130, or speech synthesizer 134.

It is noted that, as defined for the purposes of the present application, the expression "predictive model" refers to a mathematical model for making future predictions based on statistics, or on patterns learned from samples of data or "training data." That is to say, a predictive model may take the form of a stochastic model or a trained machine learning (ML) model. Various learning algorithms can be used to map correlations between input data and output data. These correlations form the mathematical model that can be used to make future predictions on new input data. Such a predictive model may include one or more logistic regression models, Bayesian models, or ML models in the form of artificial neural networks (NNs). Moreover, a "deep neural network," in the context of deep learning, may refer to a NN that utilizes multiple hidden layers between input and output layers, which may allow for learning based on features not explicitly defined in raw data. In various implementations, NNs may be trained as classifiers. It is further noted that the expressions "inference" and "prediction" are terms of art in the context of data forecasting, and as used herein have their ordinary and customary meaning known in the art.

As further shown in FIG. 1, system 100 may be implemented in a use environment including dialogue speech source 116 providing dialogue data 126, communication network 112, and user 124 utilizing client system 120 including display 122. In addition, FIG. 1 shows network communication links 114 communicatively coupling dialogue speech source 116 and client system 120 with system 100 via communication network 112. Also shown in FIG. 1 is digital character 110 rendered on display 122 of client system 120, character persona 132 of digital character 110, user profile 128 of user 124 including a user history of user 124, and emotionally attributed dialogue data 138 output by system 100.

It is noted that although system 100 may receive dialogue data 126 from dialogue speech source 116 via communication network 112 and network communication links 114, in some implementations, dialogue speech source 116 may take the form of a dialogue speech source integrated with computing platform 102, or may be in direct communication with system 100, as shown by dashed communication link 118.

It is emphasized that user profile 128, as well as other user profiles retained in user profile database 108, are exclusive of personally identifiable information (PII) of users with whom digital character 110 has interacted. Thus, although digital character 110 is typically able to distinguish an anonymous user with whom a previous interaction has occurred from anonymous users having no previous interaction experience with digital character 110, user profile database 108 does not retain information describing the age, gender, race, ethnicity, or any other PII of any user with whom digital character 110 engages in dialogue or otherwise interacts.

Although the present application refers to software code 140 including predictive model(s) 148, and optionally one or more of user profile database 108, character persona database 130, or speech synthesizer 134 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal that provides instructions to processing hardware 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts software code 140, and optionally one or more of user profile database 108, character persona database 130, or speech synthesizer 134 as being mutually co-located in system memory 106, that representation is also merely provided as an aid to conceptual clarity. More generally, system 100 may include one or more computing platforms, such as computer servers for example, which may be co-located, or may form an interactively linked but distributed system, such as a cloudbased system, for instance. As a result, processing hardware 104 and system memory 106 may correspond to distributed processor and memory resources within system 100. Thus, it is to be understood that software code 140 and optional one or more of user profile database 108, character persona database 130, or speech synthesizer 134 may be stored remotely from one another within the distributed memory resources of system 100.

Processing hardware 104 may include multiple hardware processing units, such as one or more central processing units, one or more graphics processing units, and one or more tensor processing units, one or more field-programmable gate arrays (FPGAs), custom hardware for machine-learning training or machine-learning based prediction, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 140, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, system 100 may be implemented virtually, such as in a data center. For example, in some implementations, system 100 may be implemented in software, or as virtual machines.

Although client system 120 is shown as a desktop computer in FIG. 1, that representation is provided merely as an example as well. More generally, client system 120 may be any suitable mobile or stationary computing device or system that implements data processing capabilities sufficient to provide a user interface, support connections to communication network 112, and implement the functionality ascribed to client system 120 herein. For example, in other implementations, client system 120 and may take the form of a laptop computer, tablet computer, or smartphone. In still other implementations, client system 120 may be peripheral device of system 100 in the form of a dumb terminal. In those implementations, client system 120 may be controlled by processing hardware 104 of computing platform 102.

With respect to display 122 of client system 120, display 122 may be physically integrated with client system 120, or may be communicatively coupled to but physically separate from client system 120. For example, where client system 120 is implemented as a smartphone, laptop computer, or tablet computer, display 122 will typically be integrated with client system 120. By contrast, where client system 120 is implemented as a desktop computer, display 122 may take the form of a monitor separate from client system 120 in the form of a computer tower. Furthermore, display 122 of client system 120 may be implemented as a liquid crystal display (LCD), a light-emitting diode (LED) display, an organic light-emitting diode (OLED) display, a quantum dot (QD) display, or any other suitable display screen that performs a physical transformation of signals to light.

Figure 2:
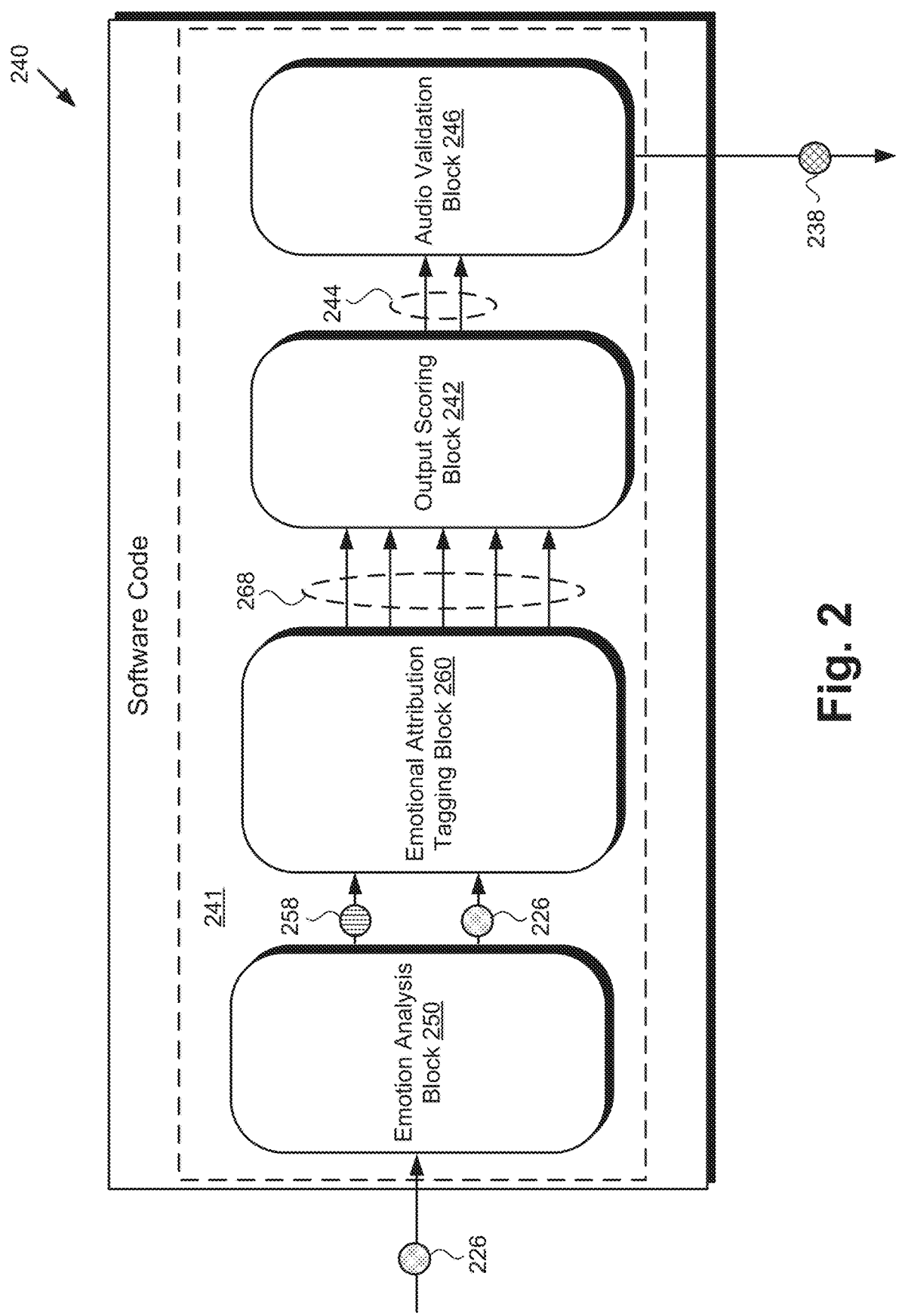
FIG. 2 shows a block diagram of an exemplary processing pipeline of the software code of the system shown in FIG. 1, according to one implementation.

FIG. 2 shows a block diagram of exemplary processing pipeline 241 of software code 240, according to one implementation. As shown in FIG. 2, processing pipeline 241 of software code 240 includes emotion analysis block 250, emotional attribution tagging block 260, optional output scoring block 242, and audio validation block 246. As further shown in FIG. 2, processing pipeline 241 implemented by software code 240 is configured to receive dialogue data 226 identifying an utterance for use by a digital character in a conversation as input, and to output emotionally attributed dialogue data 238 providing a validated emotionally enhanced utterance corresponding to the utterance identified by dialogue data 226. Also shown in FIG. 2 are emotion analysis data 258, one or more candidate emotionally enhanced utterances 268, and one or more candidate emotionally enhanced utterances 244 that have been selected for audio validation.

Software code 240, dialogue data 226, and emotionally attributed dialogue data 238 correspond respectively in general to software code 140, dialogue data 126, and emotionally attributed dialogue data 138, in FIG. 1. Consequently, software code 140, dialogue data 126, and emotionally attributed dialogue data 138 may share any of the characteristics attributed to respective software code 240, dialogue data 226, and emotionally attributed dialogue data 238 by the present disclosure, and vice versa. That is to say, like software code 240, software code 140 may implement processing pipeline 241 and include features corresponding respectively to emotion analysis block 250, emotional attribution tagging block 260, optional output scoring block 242, and audio validation block 246. Moreover, like software code 140, software code 240 may include features corresponding to predictive model(s) 148, one or more of which may be included in any or all of emotion analysis block 250, emotional attribution tagging block 260, optional output scoring block 242, and audio validation block 246.

Figure 3:
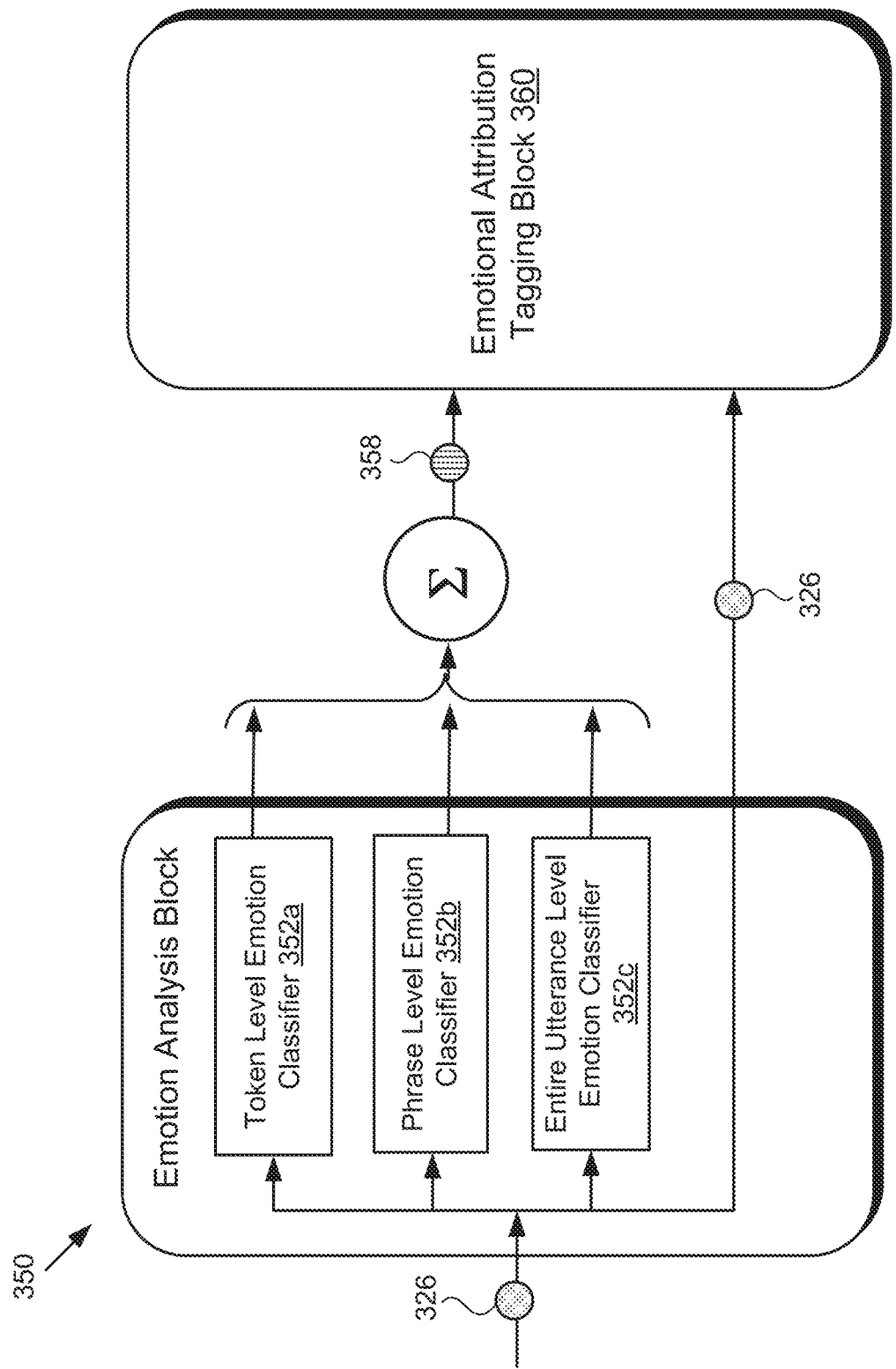
FIG. 3 shows a more detailed diagram of an exemplary emotion analysis block of the software code shown in FIGS. 1 and 2, according to one implementation.

FIG. 3 shows a more detailed diagram of exemplary emotion analysis block 350 of software code 140/240 shown in FIGS. 1 and 2, according to one implementation. As shown in FIG. 3, emotion analysis block 350 is configured to classify emotions associated with an utterance identified by dialogue data 326 at multiple structural levels of that utterance. According to the exemplary implementation shown in FIG. 3, for instance, emotion analysis block 350 may include two or more of token level emotion classifier 352a, phrase level emotion classifier 352b, or entire utterance level emotion classifier 352c, each of which, in some implementations as also shown in FIG. 3, may process dialogue data 326 in parallel, i.e., contemporaneously with one another.

In addition to dialogue data 326 and emotion classification block 350, FIG. 3 shows emotion analysis data 358 generated by emotion classification block 350 as a combination of the outputs of two or more of token level emotion classifier 352a, phrase level emotion classifier 352b, or entire utterance level emotion classifier 352c, and provided as an output to emotion attribution tagging block 360 along with dialogue data 326.

It is noted that emotion analysis block 350, emotion analysis data 358, and emotion attribution tagging block 360 correspond respectively in general to emotion analysis block 250, emotion analysis data 258, and emotion attribution tagging block 260, in FIG. 2. Consequently, emotion analysis block 250, emotion analysis data 258, and emotion attribution tagging block 260 may share any of the characteristics attributed to respective emotion analysis block 350, emotion analysis data 358, and emotion attribution tagging block 360 by the present disclosure, and vice versa. Thus, like emotion analysis block 350, emotion analysis block 250 may include features corresponding respectively to two or more of token level emotion classifier 352*a*, phrase level emotion classifier 352*b*, or entire utterance level emotion classifier 352*c*. In addition, dialogue data 326, in FIG. 3, corresponds in general to dialogue data 126 and 226 in FIGS. 1 and 2, and those corresponding features may share the characteristics attributed to any of those features by the present disclosure.

Token level emotion classifier 352*a* may be configured to identify individual tokens included in the utterance identified by dialogue data 126/226/326, as those tokens are defined above, and to analyze the emotionality of those tokens. By way of example, token level emotion classifier 352*a* may decompose the utterance into tokens using a whitespace tokenizer, as known in the art, and utilize a predictive model included among predictive model(s) 148 to analyze the emotionality of the tokens.

Analogously, phrase level emotion classifier 352*b* may be configured to identify phrases included in the utterance, as those phrases are defined above, and to analyze the emotionality of those phrases. For example, phrase level emotion classifier 352*b* may be configured to decompose the utterance identified by dialogue data 126/226/326 into phrases using a dependency or phrase structure parsing algorithm, or, depending on the implementation, the utterance could also simply be split into phrases based on punctuation. Phrase level emotion classifier 352*b* may then utilize a predictive model included among predictive model(s) 148 to analyze the emotionality of the identified phrases.

Entire utterance level emotion classifier 352*c* may be configured to analyze the emotionality of the utterance as a whole, as that utterance is defined above, using another predictive model included among predictive model(s) 148. In some implementations, entire utterance level emotion classifier 352*c* could also be applied to the phrases of the utterance, as each phrase can be viewed as a smaller utterance. Alternatively, a separate analyzer, i.e., the analyzer implemented as part of phrase level emotion classifier 352*b*, can be applied to the phrases, as shown in FIG. 3.

The outputs of token level emotion classifier 352*a*, phrase level emotion classifier 352*b*, or entire utterance level emotion classifier 352*c* are typically respective vectors. In order to retain the positional information identifying the beginning and end of each identified phrase, that positional information (i.e., beginning and end indices of each phrase within the utterance) may be extracted, an embedding may be applied to each output, and the embedded outputs of two or more of token level emotion classifier 352*a*, phrase level emotion classifier 352*b*, or entire utterance level emotion classifier 352*c* can be combined. The combination may be additive, multiplicative, or some other function which can be inverted later in processing pipeline 241, in FIG. 2.

Figure 4:
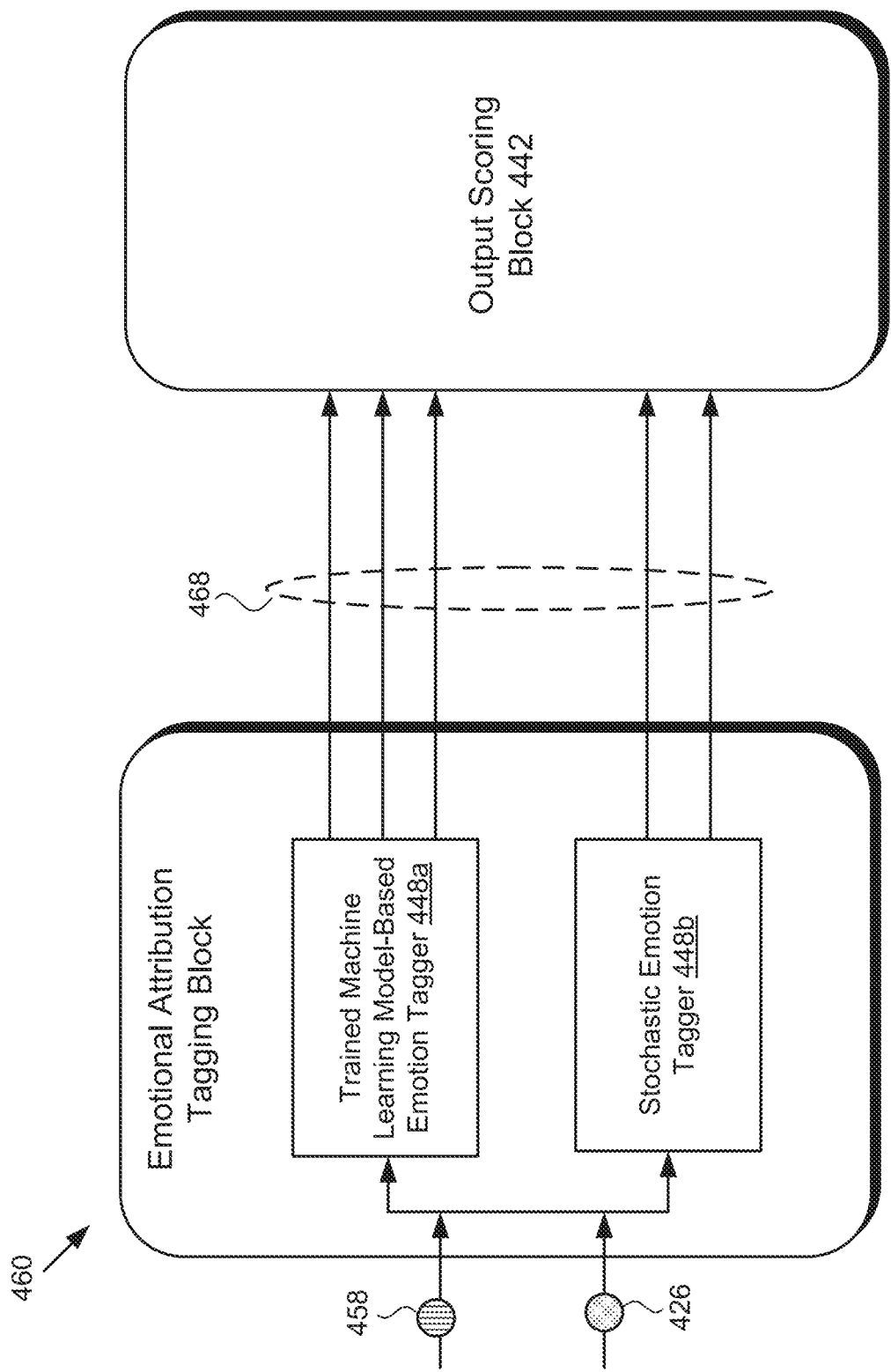
FIG. 4 shows a more detailed diagram of an exemplary emotional attribution tagging block of the software code shown in FIGS. 1 and 2, according to one implementation.

FIG. 4 shows a more detailed diagram of exemplary emotional attribution tagging block 460 of software code 140/240 shown in FIGS. 1 and 2, according to one implementation. As shown in FIG. 4, emotional attribution tagging block 460 may include one or more automated taggers to insert emotional attribution tags, using Speech Synthesis Markup Language (SSML) for example, to supplement the utterance identified by dialogue data 426 with one or more emotional attributions. According to the exemplary implementation shown in FIG. 4, for instance, emotional attribution tagging block 460 may include one of trained machine learning (ML) model-based emotion tagger 448*a* or stochastic emotion tagger 448*b*, or both of ML model-based emotion tagger 448*a* and stochastic emotion tagger 448*b*, to predict and apply emotional attribution tags to the utterance identified by dialogue data 426, using emotion analysis data 458 derived from analysis of the utterance at multiple structural levels of the utterance, as described above.

In some implementations in which trained ML model-based emotion tagger 448*a* is included as a feature of emotional attribution tagging block 460, trained ML model-based emotion tagger 448*a* may take the form of a transformer-based token insertion ML model, trained using a supervised training approach. In this implementation, the vocabulary for insertions can be considered to be the tokenized representations of given SSML, or similar emotion attribution, tags. The predictive model may take as input the emotion classified output from the above step along with any extracted entities in the original dialogue and a given character descriptor. That is to say, the transformer-based token insertion ML model may take as input one or more of: the global sentiment of the entered input text, the global mood of the entered input text, the sentiment by phrase within the input text, the sentiment by token in the given input text, a given character embedding, and extracted entities from the input text.

Acting as a fully autoregressive generator, at each time step, the transformer-based insertion model finds the most probabilistic SSML tag token and position to be inserted. This iterative process may continue until an end of sequence tag is predicted by the model; at this stage, the final emotion enhanced sequence can be outputted. In this implementation, beam search decoding can be used to provide n-best SSML insertion complete queries, where each output in n-best will have different number/placement/type of insertions. Alternatively, greedy decoding can be implemented to produce the desired emotion attribution output.

In various implementations in which stochastic emotion tagger 448*b* is included as a feature of emotional attribution tagging block 460, stochastic emotion tagger 448*b* may be trained using an unsupervised or semi-supervised training approach. Stochastic emotion tagger 448*b* may be used to perform a deep analysis of the utterance identified by dialogue data 426 using a variety of Natural Language Processing (NLP) techniques for mood/sentiment/keyword and concept understanding for multiple emotional attribution tag insertion suggestions. Probability distributions may be used to surface associations between the emotional attribution tags and the language features of tokens generated from the deep analysis. For a given emotional attribution tag sequence, transition probabilities of emotional attribution tags may be used, similar to the n-gram language model, to pick the most likely emotional attribution tag from a set of emotional attribution tags for each token.

It is noted that, as also shown in FIG. 4, in implementations in which emotional attribution tagging block 460 includes both ML model-based emotion tagger 448*a* and stochastic emotion tagger 448*b*, ML model-based emotion tagger 448*a* and stochastic emotion tagger 448*b* may be configured to operate in parallel. i.e., contemporaneously, to supplement the utterance identified by dialogue data 426 using emotion analysis data 458.

In addition to dialogue data 426, emotion analysis data 458, and emotional attribution tagging block 460, FIG. 4 shows one or more candidate emotionally enhanced utterances 468 provided as outputs by emotional attribution tagging block 460. In some implementations, as shown in FIG. 4, one or more candidate emotionally enhanced utterances 468 may be provided as inputs to optional output scoring block 442. However, in implementations in which output scoring block 442 is omitted from processing pipeline 241, in FIG. 2, one or more candidate emotionally enhanced utterances 468 may be provided as inputs to audio validation block 246.

Emotion attribution tagging block 460 and emotion analysis data 458 correspond respectively in general to emotion attribution tagging block 260/360 and emotion analysis data 258/358 FIGS. 2 and 3. Consequently, emotion attribution tagging block 260/360 and emotion analysis data 258/358 may share any of the characteristics attributed to respective emotion attribution tagging block 460 and emotion analysis data 458 by the present disclosure, and vice versa. Thus, like emotion attribution tagging block 460, emotion attribution tagging block 260/360 may include features corresponding respectively to one or more of ML model-based emotion tagger 448a or stochastic emotion tagger 448b. It is noted that either or both of ML model-based emotion tagger 448a or stochastic emotion tagger 448b correspond in general to predictive model(s) 148 by the present disclosure. That is to say, predictive model(s) 148 may share any of the characteristics attributed to either or both of ML model-based emotion tagger 448a or stochastic emotion tagger 448b by the present application, and vice versa.

In addition, one or more candidate emotionally enhanced utterances 468 and output scoring block 442 correspond respectively in general to one or more candidate emotionally enhanced utterances 268 and output scoring block 242, in FIG. 2. As a result, one or more candidate emotionally enhanced utterances 268 and output scoring block 242 may share any of the characteristics attributed to respective one or more candidate emotionally enhanced utterances 468 and output scoring block 442 by the present disclosure, and vice versa. Moreover, dialogue data 426, in FIG. 4, corresponds in general to dialogue data 126/226/326 in FIGS. 1, 2, and 3, and those corresponding features may share the characteristics attributed to any of those features by the present disclosure.

Figure 5:
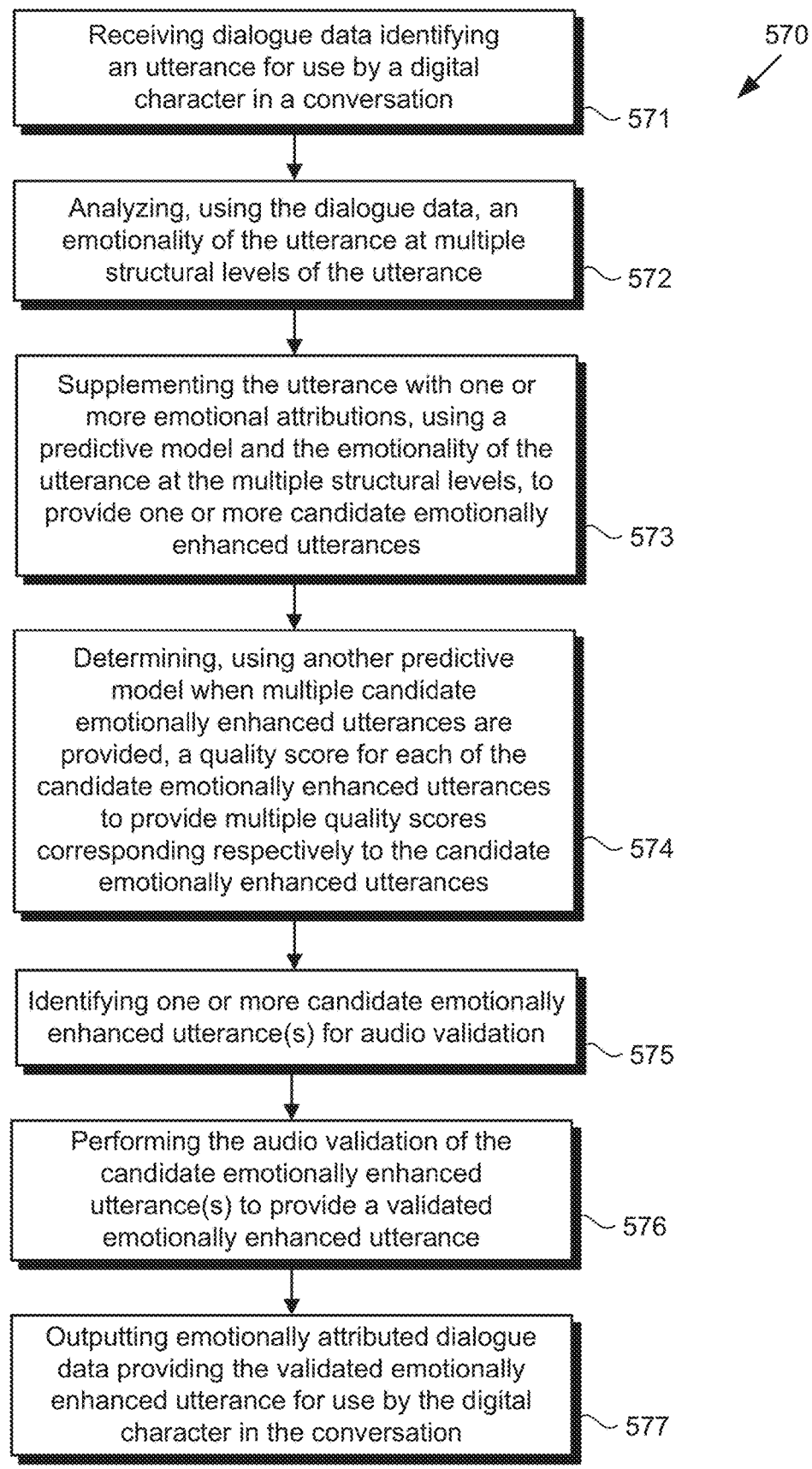
FIG. 5 shows a flowchart presenting an exemplary method for use by a system to emotionally enhance dialogue, according to one implementation.

The functionality of software code 140/240 will be further described by reference to FIG. 5. FIG. 5 shows flowchart 570 presenting an exemplary method for use by a system, such as system 100, to emotionally enhance dialogue, according to one implementation. With respect to the method outlined in FIG. 5, it is noted that certain details and features have been left out of flowchart 570 in order not to obscure the discussion of the inventive features in the present application.

Referring to FIG. 5, with further reference to FIGS. 1, 2, 3, and 4, flowchart 570 begin with receiving dialogue data 126/226/326/426 identifying an utterance for use by digital character 110 in a conversation (action 571). It is noted that in some implementations, dialogue data 126/226/326/426 may be or include text data, and may be received as a text file. Dialogue data 126/226/326/426 may be received in action 571 by emotion analysis block 250/350 of software code 140/240, executed by processing hardware 104 of system 100. For example, as shown in FIG. 1, in some implementations, dialogue data 126/226/326/426 may be received by system 100 from dialogue speech source 116, either via communication network 112 and network communication links 114 or directly via communication link 118. However, in other implementations, dialogue data 126/226/326/426 may be received by system 100 from client system 120, via communication network 112 and network communication links 114.

Continuing to refer to FIG. 5 in combination with FIGS. 1, 2, 3, and 4, the method outlined by flowchart 570 further includes analyzing, using dialogue data 126/226/326/426, the emotionality of the utterance identified by dialogue data 126/226/326/426 at multiple structural levels of the utterance (action 572). Action 572 may be performed by software code 140/240, executed by processing hardware 104 of system 100, using emotion analysis block 250/350, as described above by reference to FIG. 3. For example, and as stated above, the structural levels at which the utterance is analyzed in action 572 may include two or more of a token level, a phrase level, or an entire utterance level, as the terms token, phrase, and entire utterance are defined above.

Moreover, and as also noted above, in some implementations system 100 may include optional user profile database 108 storing user profile 128 of user 124 in conversation with digital character 110, where user profile 128 includes a user history of user 124. In those implementations, action 572 may further use user profile 128 to analyze the emotionality of the utterance. That is to say, in some implementations, action 572 may include software code 140/240 being executed by processing hardware 104 to obtain user profile 128 of user 124 and to utilize emotion analysis block 250/350 to analyze the emotionality of the utterance further using user profile 128.

In addition, or alternatively, and as further noted above, in some implementations system 100 may include optional character persona database 130 storing character persona 132 of digital character 110. In those implementations, action 572 may further use character persona 132 of digital character 110 to analyze the emotionality of the utterance. That is to say, in some implementations, action 572 may include software code 140/240 being executed by processing hardware 104 to obtain character persona 132 of digital character 110 and to utilize emotion analysis block 250/350 to analyze the emotionality of the utterance further using character persona 132.

Continuing to refer to FIG. 5 in combination with FIGS. 1, 2, 3, and 4, the method outlined by flowchart 570 further includes supplementing the utterance identified by dialogue data 126/226/326/426 with one or more emotional attributions, using one or more predictive models 148 and the emotionality of the utterance at the multiple structural levels determined from the analysis performed in action 572, to provide one or more candidate emotionally enhanced utterances 268/468 (action 573). As noted above by reference to FIG. 4, the predictive model used in action 573 may include one or more of a trained ML model, i.e., ML model-based emotion tagger 448a, or a stochastic model, i.e., stochastic emotion tagger 448b. As further noted above by reference to FIG. 4, in implementations in which the predictive model used in action 573 includes a trained ML model, that trained ML model may take the form of a transformer-based token insertion ML model.

With respect to the one or more emotional attributions used to supplement the utterance in action 573, each such emotional attribution may identify one or more of a prosodic variation, a word rate, or a nonverbal filler such as audible breathing or a pause, for example. Action 573 may be performed by software code 140/240, executed by processing hardware 104 of system 100, and using emotional attribution tagging block 260/460.

Figure 6:
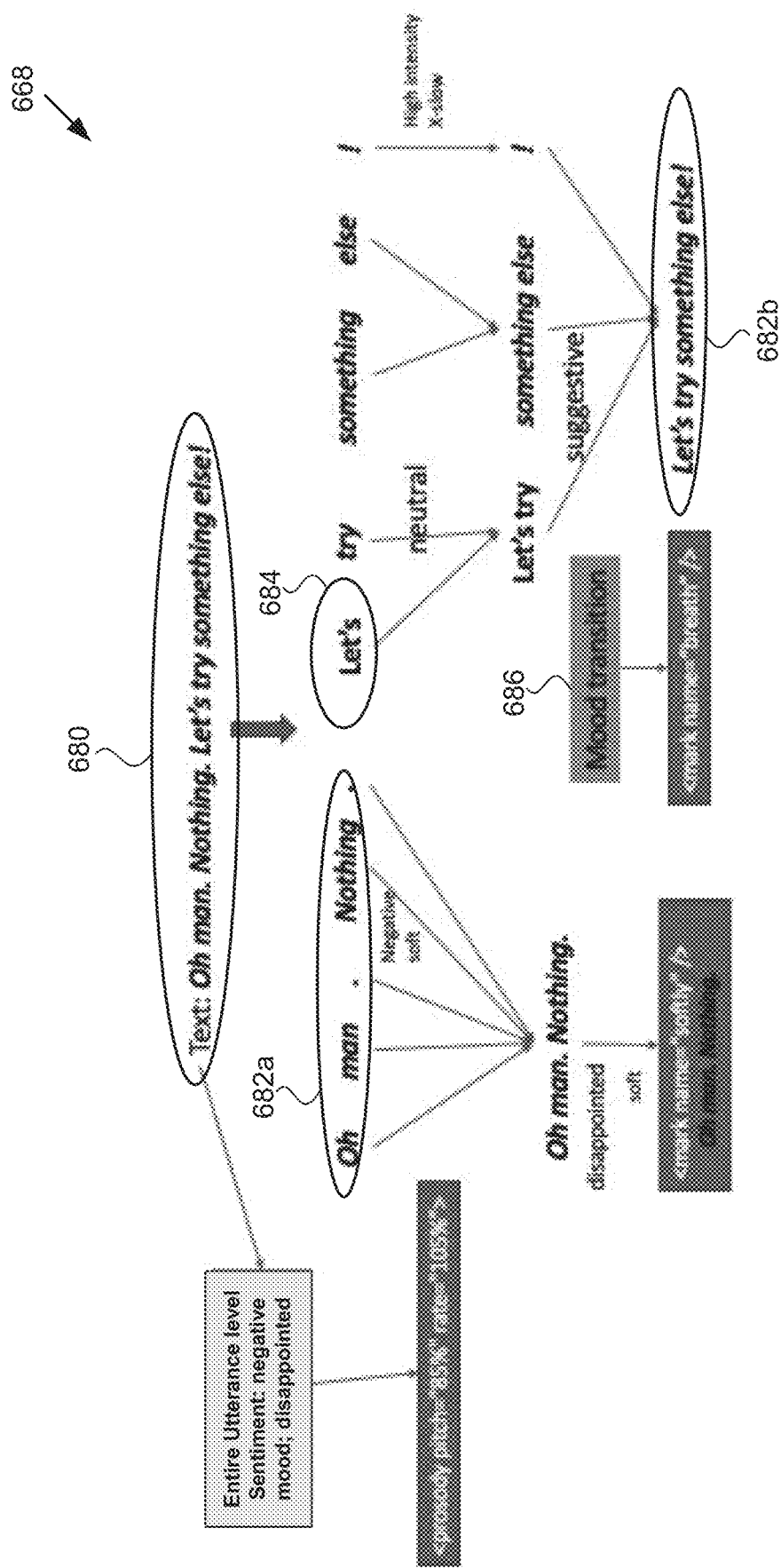
FIG. 6 shows an exemplary candidate emotionally enhanced utterance potentially for use by a digital character in a conversation.

Referring to FIG. 6 in combination with FIG. 1, FIG. 6 shows exemplary candidate emotionally enhanced utterance 668 potentially for use by digital character 110 in a conversation. As shown in FIG. 6, candidate emotionally enhanced utterance 668 includes emotional attribution tags applied at the level of entire utterance 680, at the level of phrases 682*a* and 682*b*, and at the level of tokens such as token 684. Moreover, exemplary emotionally enhanced utterance 668 includes a mood transition 686 between phrase 682*a* and 682*b*. Candidate emotionally enhanced utterance 668 corresponds in general to any one or more of one or more candidate emotionally enhanced utterances 268/468. Thus, one or more candidate emotionally enhanced utterances 268/468 may share any of the characteristics attributed to candidate emotionally enhanced utterance 668 by the present disclosure, and vice versa.

Referring to FIG. 5 in combination with FIGS. 1, 2, 3, and 4, with further reference to FIG. 6, in some implementations the method outlined by flowchart 570 may further include, determining, using another predictive model of predictive model(s) 148 when multiple candidate emotionally enhanced utterances 268/468/668 are provided in action 573, a quality score for each of candidate emotionally enhanced utterances 268/468/668 to provide multiple quality scores corresponding respectively to candidate emotionally enhanced utterances 268/468/668 (action 574). It is noted that action 574 is optional, and in some implementations, the method outlined by flowchart 570 may omit action 574. For example, in some implementations, only a single candidate emotionally enhanced utterances 268/468/668 may be provided in action 573, thereby potentially obviating a need to perform action 574. However, in implementations in which the method outlined by flowchart 570 includes action 574, action 574 may be performed by software code 140/240, executed by processing hardware 104, and using output scoring block 242/442.

The quality scores determined in action 574 may include a penalty applied to candidate emotionally enhanced utterances 268/468/668 that are tagged with more than a predetermined upper threshold number of emotional attributions, as well as to candidate emotionally enhanced utterances 268/468/668 that are tagged with less than a predetermined lower threshold number of emotional attributions. In addition, or alternatively, the quality scores determined in action 574 may include a reward applied to candidate emotionally enhanced utterances 268/468/668 that are tagged with diverse emotional attributes.

Regarding the penalty for too many or too few emotional attribution tags, denoted by $W_{tag}$:

$$W_{tag} = \begin{cases} 0 & r_l \leq N_{tag} \leq r_m \\ -W & \text{otherwise} \end{cases}$$

where $r_l$ is the minimum allowable number of emotional attribution tags, $r_m$ is the maximum allowable number of emotional attribution tags, $N_{tag}$ is the number of emotional attribution tags applied to the candidate emotional utterance, and W is the penalty weight.

With respect to the reward for diversity of emotional attribution tags, denoted by $R_{tag}$:

$$R_{tag} = n_d W_R$$

where $n_d$ is the count of unique emotional attribution tags applied to the candidate emotional utterance and $W_R$ is the reward weight.

In one implementation, the one or more candidate emotionally enhanced utterances 244 having the highest quality scores and thereby selected for subsequent audio validation may be derived from the following formula:

$$\text{Score} = \text{argmax}\left(\frac{1}{norm}\left(\sum_{i=1}^{N_{tag}} \log(P_{tag}(\text{Tag}_{tag_i})) + \sum_{i=2}^{N_{tag}-1} \log(P_{ij})\right) + W_{tag} + R_{tag}\right)$$

where $N_{tag}$ is the number of tags applied to a candidate emotionally enhanced utterance, $\text{Tag}_{tag}$ is any given emotional attribution tag, $P_{tag}$ is defined as:

$$P_{tag} = P(\text{Tag}_{tag}|\text{sentiment, mood, intensity, concept}),$$

and $$P_{ij} = P(\text{Tag}_{tag_i}|\text{Tag}_{tag_j}, \text{mood}|_{utterance}, \text{sentiment}|_{utterance})$$

where i and J=(i−1, . . . , 1) are the indices of emotional attribution tags, and $\text{mood}|_{utterance}$ and $\text{sentiment}|_{utterance}$ are the utterance level mood and sentiment, respectively.

Continuing to refer to FIG. 5 in combination with FIGS. 1, 2, 3, and 4, in some implementations the method outlined by flowchart 570 may further include identifying, based on the quality scores determined in optional action 574, one or more candidate emotionally enhanced utterances 244/544 selected for audio validation (575). In implementations in which the method outlined by flowchart 570 includes action 574, action 575 will typically be performed. However, in implementations in which the method outlined by flowchart 570 omits option action 574, action 575 may be omitted as well. When performed, action 575 may include identifying a single candidate emotionally enhanced utterance 244/544 having the highest quality score, a predetermined integer number "n" of candidate emotionally enhanced utterances 244/544 having the highest quality scores, or identifying all candidate emotionally enhanced utterances 244/544 having quality scores that equal or exceed a predetermined threshold. When included in the method outlined by flowchart 570, action 575 may be performed by software code 140/240, executed by processing hardware 104, and using output scoring block 242/442.

Continuing to refer to FIG. 5 in combination with FIGS. 1, 2, 3, 4, and 6 the method outlined by flowchart 570 further includes performing an audio validation of one or more candidate emotionally enhanced utterances 244 or 268/468/668 to provide a validated emotionally enhanced utterance (action 576). For example candidate emotionally enhanced utterances 244 or 268/468/668 may be evaluated by using text-to-speech synthesis on each candidate emotionally enhanced utterance, and analyzing one or more acoustic feature continuity metrics, such as pitch and audio spectrogram, for example, to compare them and identify the one of candidate emotionally enhanced utterances 244 or 268/468/668 with the best audio quality as the validated emotionally enhanced utterance. Action 576 may be performed by software code 140/240, executed by processing hardware 104, and using audio validation block 246 of processing pipeline 241.

Continuing to refer to FIG. 5 in combination with FIGS. 1, 2, 3, and 4, the method outlined by flowchart 570 further includes outputting emotionally attributed dialogue data 138/238 providing the validated emotionally enhanced utterance for use by digital character 110 in the conversation with user 124 (action 577). It is noted that in some implementations, like dialogue data 126/226/326/426, emotionally attributed dialogue data 138/238 may be or include text data, and may be output in action 577 as a text file. As shown in FIG. 1, in some implementations emotionally attributed dialogue data 138/238 may be output to optional speech synthesizer 134 of system 100. Alternatively, or in addition, in some implementations emotionally attributed dialogue data 138/238 may be output in action 577 by being transmitted to client system 120 via communication network and network communication links 114. Action 577 may be performed by software code 140/240, executed by processing hardware 104 of system 100.

In some implementations, the method outlined by flowchart 570 may conclude with action 577 described above, as shown in FIG. 5. However, in other implementations, that method may further include controlling a speech synthesizer to generate, using emotionally attributed dialogue data 138/238, the validated emotionally enhanced utterance for digital character 110. In some implementations, as noted above, system 100 may include optional speech synthesizer 134. In some of those implementations, speech synthesizer 134 may be controlled by processing hardware 104 of system 100 to generate the validated emotionally enhanced utterance for digital character 110, using emotionally attributed dialogue data 138/238.

Alternatively, or in addition, and as also noted above, in some implementations client system 120 may be a peripheral dumb terminal of system 100, under the control of processing hardware 104 of system 100. In those implementations, a speech synthesizer resident on client system 120 (speech synthesizer resident on client system 120 not shown) may be controlled by processing hardware 104 of system 100 to generate the validated emotionally enhanced utterance for digital character 110, using emotionally attributed dialogue data 138/238.

With respect to the method outlined by flowchart 570, it is emphasized that, in some implementations, actions 571, 572, 573 (hereinafter "actions 571-573") and actions 576 and 577, or actions 571-573, 574, 575, 576, and 577, or actions 571-573, 575, 576, and 577, may be performed in an automated process from which human involvement may be omitted.

Thus, the present application discloses systems and methods for emotionally enhancing dialogue. The present application discloses systems and methods that advance the state-of-the-art by inflecting speech scripted or dynamically generated by a generative model like GPT3 for a digital character with emotional attributes at multiple structural levels of the scripted speech, in real-time relative to a dialogue between the digital character and an interaction partner such as a human user. Moreover, the present animation solution can advantageously be implemented as substantially automated systems and methods.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform having a speech synthesizer, a processing hardware and a system memory storing a software code, the software code including at least one of a trained machine learning (ML) model configured to function as an autoregressive generator or a stochastic model trained using unsupervised or semi-supervised learning;
   the processing hardware configured to execute the software code to:
     receive dialogue data identifying an utterance for use by a digital character in a conversation;
     analyze, using the dialogue data, an emotionality of the utterance at a plurality of structural levels of the utterance;
     supplement the utterance with one or more emotional attributions, using the at least one of the trained ML model or the stochastic model and the emotionality of the utterance at the plurality of structural levels, to provide a plurality of candidate emotionally enhanced utterances;
     perform an audio validation of at least some of the plurality of candidate emotionally enhanced utterances to provide a validated emotionally enhanced utterance including a non-verbal vocalization, wherein the audio validation identifies the validated emotionally enhanced utterance as having a best audio quality of the at least some of the plurality of candidate emotionally enhanced utterances;
     output an emotionally attributed dialogue data providing the validated emotionally enhanced utterance for use by the digital character in the conversation; and
     synthesize, using the speech synthesizer and the emotionally attributed dialogue data, the validated emotionally enhanced utterance to generate a synthesized speech for utterance by the digital character.

2. The system of claim 1, wherein the digital character is configured to utter the synthesized speech.

3. The system of claim 1, wherein the plurality of structural levels of the utterance comprise at least two of token level, a phrase level, or an entire utterance level.

4. The system of claim 1, wherein the predictive model comprises the trained ML model, and wherein the trained ML model comprises transformer-based token insertion ML model.

5. The system of claim 4, wherein the transformer-based token insertion ML model takes as input one or more of: a global sentiment of the dialogue data, a global mood of the dialogue data, a sentiment by phrase within the dialogue data, a sentiment by token in the dialogue data, a given character embedding, or extracted entities from the dialogue data.

6. The system of claim 1, wherein the one or more emotional attributions identify one or more of a prosodic variation, or a word rate.

7. The system of claim 1, wherein the conversation is between the digital character and a user of the system, and wherein the processing hardware is further configured to execute the software code to:
   obtain a user profile of the user, the user profile including a user history of the user; and
   analyze the emotionality of the utterance further using the user profile.

8. The system of claim 1, wherein the digital character is associated with a character persona, and wherein the processing hardware is further configured to execute the software code to:
   obtain the character persona; and
   analyze the emotionality of the utterance further using the character persona.

9. The system of claim 1, wherein the processing hardware is further configured to execute the software code to:
    determine, using another predictive model of the software code, a quality score for each of the plurality of candidate emotionally enhanced utterances to provide a plurality of quality scores corresponding respectively to the plurality of candidate emotionally enhanced utterances; and
    identify, based on the plurality of quality scores, the at least some of the plurality of candidate emotionally enhanced utterances for the audio validation.

10. The system of claim 1, wherein the dialogue data and the emotionally attributed dialogue data comprise text.

11. The system of claim 1, wherein the validated emotionally enhanced utterance further include a non-verbal filler.

12. A method for use by a system including a computing platform having a speech synthesizer, a processing hardware and a system memory storing a software code, the software code including at least one of a trained machine learning (ML) model configured to function as an autoregressive generator or a stochastic model trained using unsupervised or semi-supervised learning:
    receiving, by the software code executed by the processing hardware, dialogue data identifying an utterance for use by a digital character in a conversation;
    analyzing, by the software code executed by the processing hardware and using the dialogue data, an emotionality of the utterance at a plurality of structural levels of the utterance;
    supplementing the utterance with one or more emotional attributions, by the software code executed by the processing hardware and using the at least one of the trained ML model or the stochastic model and the emotionality of the utterance at the plurality of structural levels, to provide a plurality of candidate emotionally enhanced utterances;
    performing, by the software code executed by the processing hardware, an audio validation of at least some of the plurality of candidate emotionally enhanced utterances to provide a validated emotionally enhanced utterance including a non-verbal vocalization, wherein the audio validation identifies the validated emotionally enhanced utterance as having a best audio quality of the at least some of the plurality of candidate emotionally enhanced utterances;
    outputting, by the software code executed by the processing hardware, an emotionally attributed dialogue data providing the validated emotionally enhanced utterance for use by the digital character in the conversation; and
    synthesizing, by the software code executed by the processing hardware using the speech synthesizer and the emotionally attributed dialogue data, the validated emotionally enhanced utterance to generate a synthesized speech for utterance by the digital character.

13. The method of claim 12, further comprising:
    the digital character uttering the synthesized speech.

14. The method of claim 12, wherein the plurality of structural levels of the utterance comprise at least two of token level, a phrase level, or an entire utterance level.

15. The method of claim 12, wherein the predictive model comprises the trained ML model, and wherein the trained ML model comprises a transformer-based token insertion ML model.

16. The method of claim 12, wherein the one or more emotional attributions identify one or more of a prosodic variation, or a word rate.

17. The method of claim 12, wherein the conversation is between the digital character and a user of the system, the method further comprising:
    obtaining, by the software code executed by the processing hardware, a user profile of the user, the user profile including a user history of the user; and
    analyzing the emotionality of the utterance further using the user profile.

18. The method of claim 12, wherein the digital character is associated with a character persona, the method further comprising:
    obtaining, by the software code executed by the processing hardware, the character persona; and
    analyzing the emotionality of the utterance further using the character persona.

19. The method of claim 12, further comprising:
    determining, by the software code executed by the processing hardware and using another predictive model of the software code, a quality score for each of the plurality of candidate emotionally enhanced utterances to provide a plurality of quality scores corresponding respectively to the plurality of candidate emotionally enhanced utterances; and
    identifying, by the software code executed by the processing hardware based on the plurality of quality scores, the at least some of the plurality of candidate emotionally enhanced utterances for the audio validation.

20. The method of claim 12, wherein the dialogue data and the emotionally attributed dialogue data comprise text.

21. The method of claim 12, wherein the validated emotionally enhanced utterance further include a non-verbal filler.

* * * * *